W. P. DEVINE.
SPECTACLES.
APPLICATION FILED NOV. 16, 1920.
1,371,413.
Patented Mar. 15, 1921.
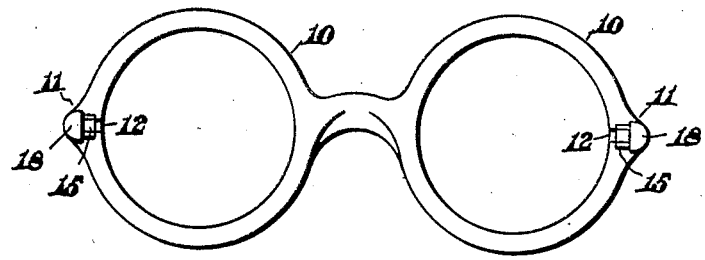
Fig. 1.
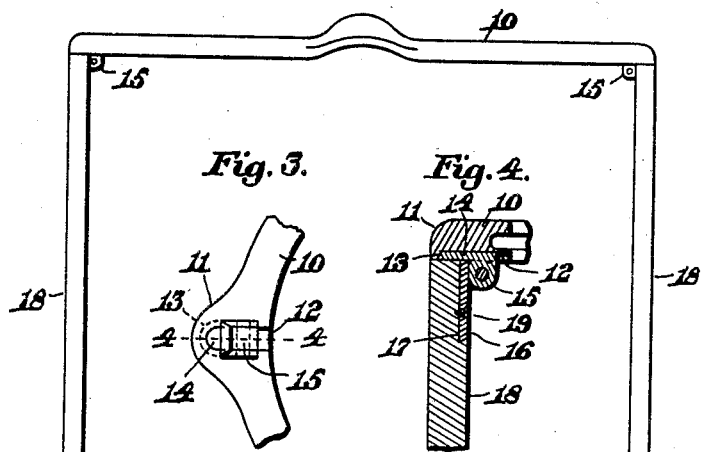
Fig. 2.
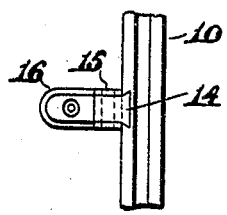
Fig. 3.
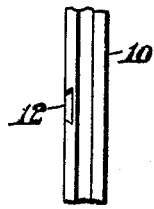
Fig. 4.
Fig. 5.
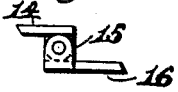
Fig. 6.
Fig. 7.
Fig. 8.
Inventor:
William P. Devine,
by Walter E. Lombard,
Atty.

UNITED STATES PATENT OFFICE.

WILLIAM P. DEVINE, OF BOSTON, MASSACHUSETTS.

SPECTACLES.

1,371,413.	Specification of Letters Patent.	Patented Mar. 15, 1921.

Application filed November 16, 1920. Serial No. 424,533.

*To all whom it may concern:*

Be it known that I, WILLIAM P. DEVINE, a citizen of the United States of America, and a resident of Boston, in the county of Suffolk and State of Massachusetts, have invented certain new and useful Improvements in Spectacles, of which the following is a specification.

This invention relates to spectacles, and has for its object the provision of means for connecting the temples thereto whereby the spectacles may be constructed cheaper and be capable of quickly substituting one form of temple for another.

The invention consists of providing the bow with grooved projections oppositely disposed and mounting in the grooves of said projections the leaves of hinged connections the movable leaves of which are adapted to be mounted in grooves in the butt ends of the temples.

The invention further consists in making the grooves in the bow and temples dovetailed and fitting thereto the leaves of the hinges so that the parts may be held in position without other fastenings if desired, although it is preferable to provide one securing member extending through the movable leaf of the hinge into engagement with the temple.

The invention further consists in providing a hinge connection between the bow and temples of such a construction that the leaves thereof will extend in opposite directions when the hinge is closed.

The invention further consists in making the grooves in the bow closed at their outer ends so that when the metal hinged connection is installed between said bow and the temples no metal parts will be exposed to view when the spectacles are in use.

The invention further consists of certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings:

Figure 1 represents an elevation of a pair of spectacles embodying the principles of the present invention.

Fig. 2 represents a plan of the same.

Fig. 3 represents an enlarged elevation showing the hinge connection secured to a portion of the bow.

Fig. 4 represents a horizontal section of same, on line 4, 4 on Fig. 3, and showing the temple applied to the movable leaf of hinge.

Fig. 5 represents a side elevation of the same, with the temple removed.

Fig. 6 represents an elevation of a portion of the bow, showing the dovetailed groove to receive the hinge connection.

Fig. 7 represents an end elevation of the butt of one of the temples, and

Fig. 8 represents a plan of the hinge connection removed from the bow and temple.

Similar characters indicate like parts throughout the several figures of the drawing.

In the drawings, 10 is the bow of a pair of spectacles, having at opposite ends the projections 11.

The inner face of each projection 11 has cut or otherwise formed therein a groove 12 having its outer end closed and preferably under cut as at 13.

The side walls of the grooves 12 are also preferably under cut, forming dovetailed depressions adapted to receive the leaves 14 of the hinge connections 15. These leaves 14 fit the grooves 13 and are prevented from moving endwise when the lenses are positioned in the bow 10.

If desired, these leaves 14 may be secured in position in the grooves 13 by means of cement or other means. Lateral displacement of the leaves 14 is prevented by the inclined walls of the grooves 13.

The movable leaves 16 of the hinge connections 15 are adapted to fit into the dovetailed grooves 17 cut into or otherwise formed in the inner face of the butt ends of the temples 18.

A screw 19 is threaded to each movable leaf 16 and has a pointed end extending into the temple 18 to prevent end movement thereof relatively to the leaf 16.

When the hinge connection is closed, as indicated in Fig. 8 of the drawing, the leaves 14, 16 extend in opposite directions.

By means of this construction, the bow of the spectacles may be provided with permanent hinge connections to the movable leaves 16 of which various forms of temples 18 may be quickly applied.

By loosening the screw 19, the temples may be moved endwise of the leaves 16 and detached therefrom, and another form of temple may be substituted for the one removed.

When the temples 18 are open and in use, the ends of the butts thereof have a solid bearing against the inner faces of the projections 11, thereby giving great rigidity to the spectacles.

When the spectacles are in use, no metal parts are exposed, as the entire hinge connections between the bow and temples are on the inner faces thereof and disposed within the dovetailed grooves formed therein.

By using this form of hinge connection, the projections 11 may be greatly reduced in length over the forms of spectacles now in general use made of celluloid or similar material, thereby greatly improving the appearance of the same.

It is obvious that the spectacles thus constructed will be stronger, as no securing member is required to hold the leaf 14 in position on the bow, and the screw 19 does not extend through the temple 18, but its point simply impinges against the surface sufficiently to prevent accidental end movement relatively to the leaf 16.

It is believed that the operation and many advantages of the invention will be understood readily without further description.

Having thus described my invention, I claim:

1. The combination of a spectacle bow having oppositely disposed projections each provided with a groove formed therein; and two temples each provided with a hinge having a leaf fitting and adapted to be secured in a groove.

2. The combination of a spectacle bow having oppositely disposed projections each provided with a groove formed therein; and undercut at its inner end; and two temples each provided with a hinge having a leaf fitting a groove and provided with an extension adapted to be positioned in said undercut portion of said groove.

3. The combination of a spectacle bow having oppositely disposed projections each provided with a dovetailed groove formed therein; and two temples each provided with a hinge having a leaf fitting and adapted to be secured in a groove.

4. The combination of a spectacle bow having oppositely disposed projections, each provided with a dovetailed groove formed therein and extending toward the outer end of said projection; and a temple provided with a hinge having a leaf fitting and adapted to be secured in each groove.

5. The combination of a spectacle bow having oppositely disposed projections each provided with a groove therein; two temples each provided in its butt end with a groove formed therein; and hinge connections between said bow and temples, the leaves of said hinge connections being secured in said grooves.

6. The combination of a spectacle bow having oppositely disposed projections each provided with a groove therein; two temples each provided in its butt end with a groove formed therein; and hinge connections between said bow and temples, the leaves of said hinge connections being secured in said grooves and extending in opposite directions when closed.

7. The combination of a spectacle bow; hinges having leaves secured to the opposite ends of said bow and provided with movable leaves having inclined sides; and temples having in their butt ends grooves to receive said movable leaves.

8. The combination of a spectacle bow; hinges having leaves secured to the opposite ends of said bow and provided with movable leaves having inclined sides; and temples having in their butt ends dovetailed grooves to receive said movable leaves.

9. The combination of a spectacle bow; hinges having leaves secured to the opposite ends of said bow and provided with movable leaves having inclined sides; temples having in their butt ends grooves to receive said movable leaves; and threaded members in said movable leaves extending into said temples.

10. The combination of a spectacle bow; hinges having leaves secured to the opposite ends of said bow and provided with movable leaves having inclined sides; temples having in their butt ends dovetailed grooves to receive said movable leaves; and a screw in each movable leaf having a pointed end extending into said temple.

Signed by me at 746–7 Old South Bldg., Boston, Mass., this 15th day of November, 1920.

WILLIAM P. DEVINE.

Witnesses:
  WALTER E. LOMBARD,
  NATHAN C. LOMBARD.